(12) United States Patent
De Koning

(10) Patent No.: US 6,377,327 B1
(45) Date of Patent: Apr. 23, 2002

(54) OPTICAL SWITCHING ELEMENT

(75) Inventor: Hendrik De Koning, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/019,644

(22) Filed: Feb. 6, 1998

(30) Foreign Application Priority Data

Feb. 13, 1997 (EP) .............................................. 97200398

(51) Int. Cl.$^7$ .............................................. G02F 1/1339
(52) U.S. Cl. ...................................... 349/153; 349/154
(58) Field of Search ................................. 349/153, 154

(56) References Cited

U.S. PATENT DOCUMENTS 5,621,553 A * 4/1997 Nichinguchi et al. ....... 349/153

FOREIGN PATENT DOCUMENTS

| JP | 60-146228 | * | 8/1985 | .................. 349/153 |
| JP | 61-2155424 | * | 9/1986 | .................. 349/153 |
| JP | 3-296724 | * | 12/1991 | .................. 349/153 |
| JP | 4-243229 | * | 8/1992 | .................. 349/153 |
| JP | 5-173150 | * | 7/1993 | .................. 349/154 |

* cited by examiner

Primary Examiner—James Dudek
(74) Attorney, Agent, or Firm—John C. Fox

(57) ABSTRACT

Electro-optical element (shutter) which is switchable between two or more optical states and has a large mechanical rigidity because an extra spacer edge is provided so that no or hardly any spacers are required in the active area. By providing inlet and outlet apertures in the extra spacer edge, contaminations are prevented from being left in the active area during filling. The active area thus remains free from disturbances.

10 Claims, 3 Drawing Sheets

OPTICAL SWITCHING ELEMENT

BACKGROUND OF THE INVENTION

The invention relates to an optical switching element having two substrates provided with a first drive electrode and a second transparent drive electrode, said substrates enclosing, within a sealing edge, a layer of an electro-optical material which is switchable between a plurality of optical states.

Such optical switching elements are used, for example in (video) camera shutters, diaphragms, grey filters, but also in, for example applications for illumination.

An optical switching element of such a type usually comprises a liquid crystalline material or a PDLC material (polymer dispersed liquid crystal material) between the two supporting plates. The mutual overlap of the drive electrodes on the two supporting plates determine the switching surface area (active area) which, dependent on the voltage on the drive electrodes, transmits a larger or smaller quantity of light.

Both when using a liquid crystalline material and an electro-optical material such as a PDLC, the distance between the substrates must be the same throughout the surface area because variations of thickness of the layer of electro-optical material cause variations of the optical properties, so that the operation of, for example a shutter made with such an optical element is affected. A phenomenon referred to as "smear" may occur. Moreover, locally unwanted lens actions occur at locally thicker or thinner parts. To keep the two supporting plates spaced apart at a constant mutual distance, spacer elements in the form of rod-shaped or ball-shaped "spacers" which are spread (uniformly or not uniformly) on the surface are generally used. The presence of these spacers is at the expense of the effective aperture and gives rise to an increased "flare". Moreover, contaminations may be left at the location of the spacers, when the optical switching element is being filled with liquid crystalline material.

OBJECTS AND SUMMARY OF THE INVENTION

It is an object of the invention to provide an optical switching element in which one or more of the above-mentioned drawbacks are obviated as much as possible.

To this end, an optical switching element according to the invention is characterized in that at least one further edge enveloping a part of the layer of electro-optical material and having at least one inlet aperture and at least one outlet aperture is situated between the two substrates within the area bounded by the sealing edge, said enveloping edge having substantially the same thickness as the sealing edge.

"Substantially the same thickness" is herein understood to mean such a thickness that the two substrates are spaced apart at the same distance by the different edges; the real thickness may differ, for example, because the sealing edge is only situated between the substrates and the further edge is situated between electrodes provided on the substrates (with or without extra layers such as, for example color filters).

Since, as it were, the two edges now take over the function of the spacers, these spacers may be entirely or largely omitted, at least within the further enveloping edge, while a uniform thickness is nevertheless maintained. Moreover, the two edges may be manufactured in the same process step, for example by means of silk screening of epoxy glue. The first sealing edge now functions with one or more enveloping edges as a rigid support for the two substrates, while a constant distance between the two substrates is obtained. In a further embodiment, the area between the two edges, which is usually unimportant or less important for the optical function of the optical component, is provided with spacer elements, which enhances the rigidity.

By providing the further enveloping edge with (preferably facing) inlet and outlet apertures, the electro-optical material, which is introduced in its liquid phase into the space within this further edge and is subsequently polymerized, if necessary, can flow on as far as a space between the sealing edge and the further edge. It is thereby achieved that, for example, contaminations in the liquid front (for example, dust particles which are taken up from an orienting layer or particles which are released by demixing the filling material (due to chromatography)), are deposited outside the "active area" (the area bounded by the further edge) and thus cannot detrimentally influence the transparency of the optical element in the light-transmissive state. To enforce the flow and prevent a possible flow, along the outer side, outside the active area, a further embodiment is characterized in that parts associated with the further enveloping edge between the inlet aperture and the outlet aperture extend as far as the sealing edge.

When a liquid crystalline material is used as an electro-optical material, a twisted nematic material between crossed polarizers is generally used, so that it is possible to switch between a substantially light-transmissive state and a substantially opaque state. The use of polarizers is, however, at the expense of absorption in the polarizers of a part of the light in the light-transmissive state (50% or more).

Therefore, an electro-optical material which is switchable between a light-transmissive state (50% or more) and a light-diffusing state is preferably used. Examples are PDLC material (Polymer Dispersed Liquid Crystal), NAPC material (Nematic Aligned Polymer Crystal), and (nematic) anisotropic gels with or without chiral additions. In the light-transmissive state, much more than 50% of the light is then transmitted. However, light is also transmitted in the diffusing state; in, for example, digital (video) cameras provided with one or more CCD sensors (Charge Coupled Devices), this causes a constant background noise which can be compensated electronically.

A further preferred embodiment of an optical switching element according to the invention is characterized in that the first and the second transparent drive electrode are provided with drive means and are structured in such a way that facing parts of the transparent drive electrodes are substantially completely bounded by the further enveloping edge. With the aid of the drive means, the active area may be switched from, for example, the light-transmissive state to the light-diffusing state, but intermediate states are alternatively possible.

The electrodes do not need to be formed as an integral part on the two supporting plates, but may be subdivided into sub-electrodes within the electrode parts bounded by the further enveloping edge, the separate sub-electrodes being provided with separate drive means. The active area is then subdivided into separately switching areas, for example annular areas with which a diaphragm function can be realized.

These and other aspects of the invention are apparent from and will be elucidated with reference to the embodiments described hereinafter.

BRIEF DESCRIPTION OF THE DRAWINGS

In the drawings.

The Figures are diagrammatic and not to scale. Corresponding elements are generally denoted by the same reference numerals.

DESCRIPTION OF THE PREFERRED EMBODIMENTS

Figure 1:
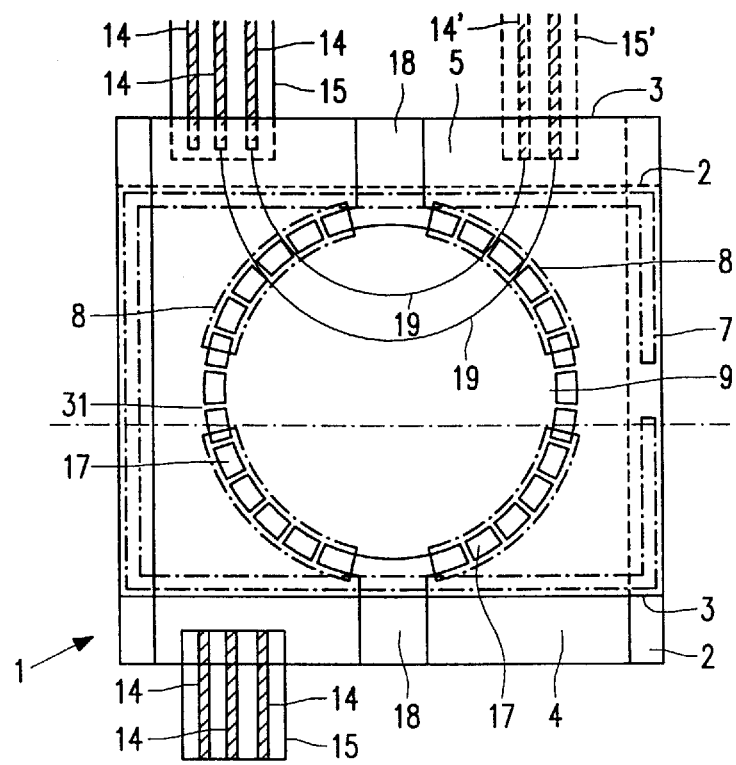
FIG. 1 is a plan view of an optical switching element according to the invention.

FIG. 1 is a plan view of an optical switching element 1, in this example a shutter for a CCD camera, with a first substrate 2 having a first transparent drive electrode 4, and a second substrate 3 having a second transparent drive electrode 5. A layer of an electro-optical material 6, which is switchable between a plurality of optical states, is situated between the two substrates which are made of, for example quartz or glass (or flexible foils). In the relevant example, a polymerized nematic liquid crystal gel (with or without a chiral addition) is used for this purpose, but other electro-optical materials are alternatively possible, such as, for example PDLC, or NAPC. Non-polymerized liquid crystal material may also be used, for example in optical switching elements based on liquid crystal effects such as dynamic scattering and (S)TN. When the (super)twisted nematic effect is used, the layer 6 is situated between polarizers (not shown).

The assembly is sealed by means of a sealing edge 7 having a filling aperture 11 which is closed after the element has been filled with the liquid crystal material to be polymerized (or with another material).

According to the invention, one further edge 8 having the same thickness as the sealing edge 7 is situated (in this embodiment) between the two substrates 2, 3 within the area bounded by the sealing edge 7. The further edge has an inlet aperture 9 and an outlet aperture 31.

Figure 3:
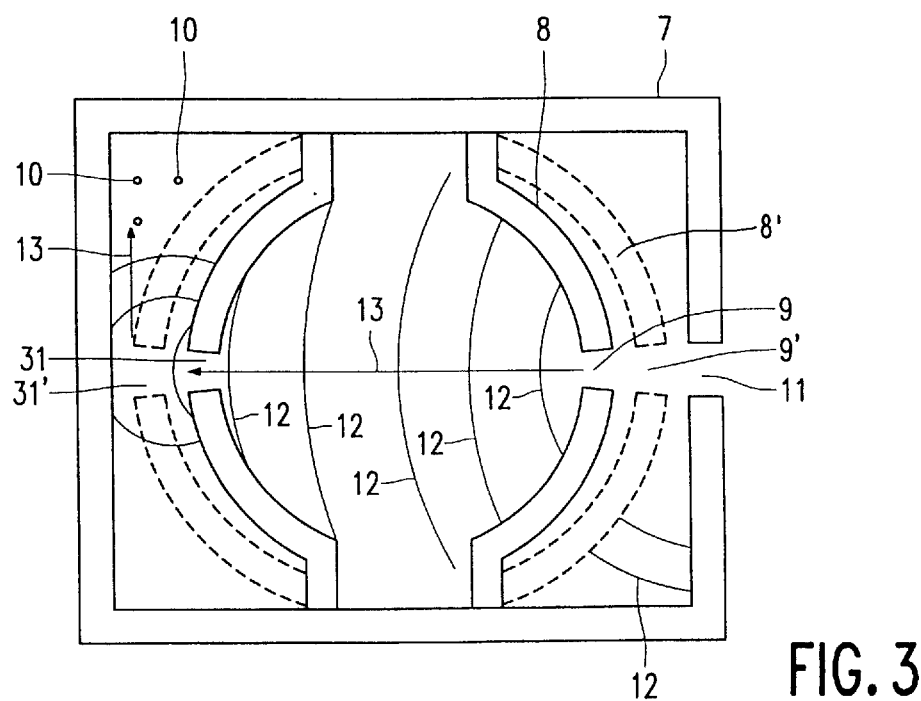
FIG. 3 is a plan view of the sealing edge and further enveloping edges in FIG. 1.

A plan view of the sealing edges 7 (with the filling aperture 11) and the edges 8 (with the apertures 9, 31) is shown in FIG. 3. The edges 8 (and possible extra enveloping edges 8' having apertures 9', 31', denoted by broken lines in FIG. 3) function as spacers. Together with the sealing edge 7, this is sufficient to ensure a constant distance between the substrates throughout the surface area of the optical element. In the active area (the area within the enveloping edge 8), hardly any or even no spacers at all are required, so that there is less scattering on the spacers (less flare) in this area in the light-transmissive state. In another embodiment, extra spacers in the form of, for example glass fiber particles having the same thickness as the edges 7, 8 are provided in the area between these edges 7 and 8; a combination of extra spacers 10 and extra edges 8' is alternatively possible.

In the present example, the edge 8 has two apertures 9, 31 which are in line with the filling aperture 11. The LC material or a gel or monomer to be polymerized is introduced into the space between the substrates by creating a sub-pressure therein so that the liquid is sucked up by capillary action. Notably with gels and monomers, the liquid may contain contaminations or absorb during filling. These contaminations are mainly present at the filling fronts 12 which are displaced in the direction denoted by arrow 13. Due to the presence of the second aperture 31, the filling fronts extend beyond the aperture 31 and said contaminations are taken along to the area (remote from the filling aperture 11) between the edges 7 and 8, while in the "active area" (the area within the further enveloping edge 8) hardly any or no contaminations are left. After curing of the gels or polymerization of the monomers, this enhances the transparency of the actual active area and reduces diffusion effects in the driven (fully transmissive) state of the shutter. Also color effects (chromaticity) are prevented. Since the sealing edge 7 and the further enveloping edge 8 are in contact with each other in this embodiment, no liquid can flow via the outlet aperture 31 to the active area.

For electrically driving the electrodes, the ITO patterns are contacted by means of one or more connection conductors 14, three in this embodiment, which are provided on, for example a tape or strip 15. At the area of the edge 8, apertures 17 are provided in the ITO patterns on both substrates 3, 4 so as to obtain a better adhesion of the edge 8 to the substrates. This edge (and possible other edges 8') and the sealing edge 7 are made of, for example a layer of a photosensitive resin, provided with spacers 29, which is patterned photolithographically. A better adhesion directly on the glass (quartz) substrate is also obtained when using a glue. The edges 7, 8 together with possible spacers 10 may also be obtained by means of patterned etching of a quartz layer having a thickness of about 1 to 25 $\mu$m in this embodiment.

At the areas where the substrates 2, 3 do not overlap, the ITO patterns have apertures 18. These are not strictly necessary for the operation of the shutter. However, if a second strip 15' with connection conductors 14' is provided (only shown for substrate 3 by means of broken lines in FIG. 1), the aperture 18 prevents an electric current from following substantially only current paths outside the active area at a potential difference between the connection conductors 14 and the connection conductors 14'. In contrast, the current paths now follow the trajectories 19. In the resistance constituted by the ITO, the current dissipates energy so that the layer of electro-optical material is heated; a camera having such a shutter can thus also be used at lower temperatures.

Since ITO patterns overlap also outside the active area bounded by the edge 8, there will also be switching between different optical states outside this area. In a camera application, these areas are covered.

Figure 6:
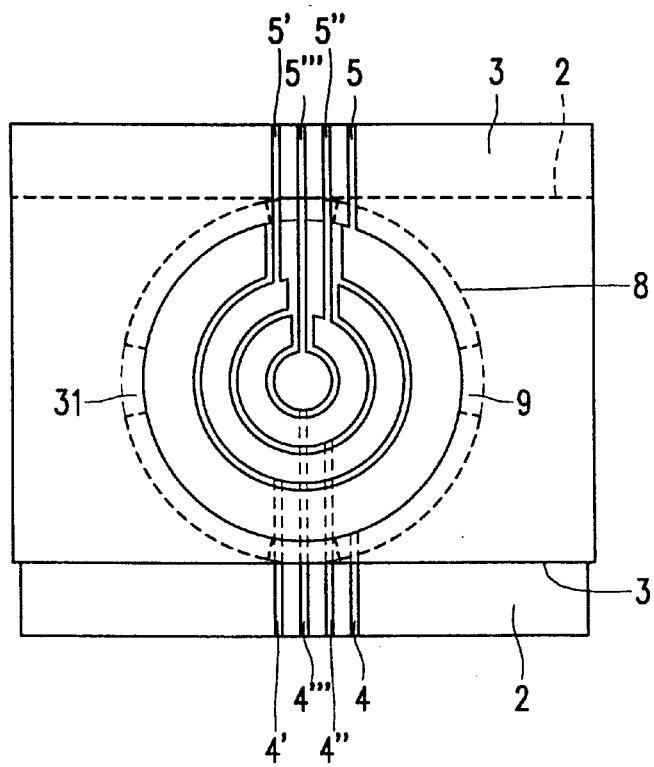
FIG. 6 is a plan view of another optical switching element according to the invention.

FIG. 6 is a plan view of another optical element according to the invention, in which switching only takes place within the edge 8. The facing parts of the ITO patterns 4, 4', 4"4'" and 5, 5', 5", 5'" constitute a pattern of a round central part with concentrical rings around it. The edge 8, with apertures 9, 31, adjoins the outer ring. The enveloping edge is not shown in FIG. 6. Such an optical element may be used, for example in a diaphragm-operated shutter.

Figure 4:
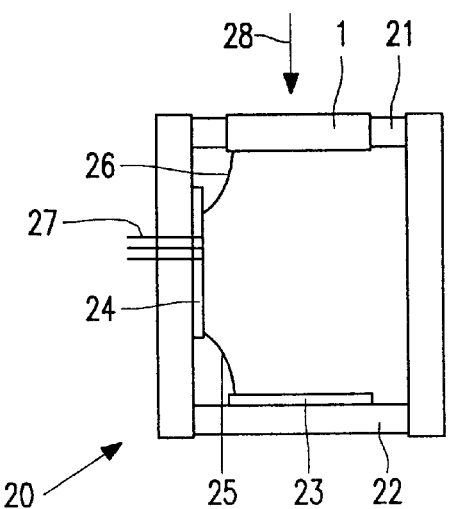
FIG. 4 shows an image pick-up device provided with an optical switching element according to the invention.

FIG. 4 shows diagrammatically a CCD camera 20, the front side 21 of which is provided with an optical element as shown in FIG. 1, while a CCD sensor 23 is arranged on the rear side 22. Via the active area of the shutter 1 (the other part is rendered opaque) incident light 28 is imaged via or not via a lens system on the sensitive part of the CCD sensor 23. The camera further comprises a control element 24 (in the form of, for example an IC) which drives the optical element via control wires 26 and drives the sensor 23 via control wires 25, while information is also read from the sensor via the wires 25. The assembly is controlled by means of control wires 28, while the information is further read from the sensor via the wires 28.

Figure 5A:
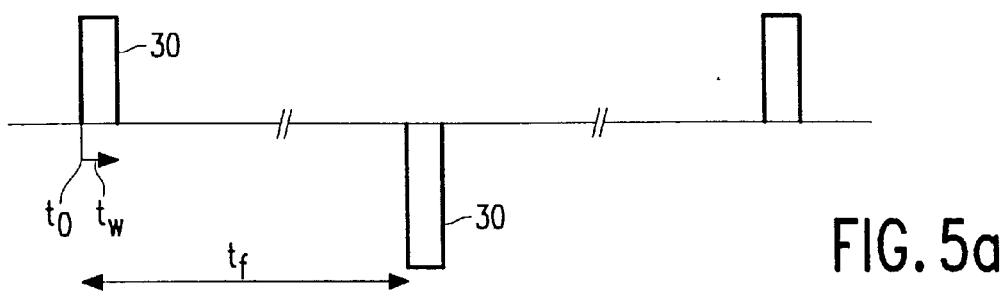
FIG. 5 shows a part of a drive signal as used in the image pick-up device of FIG. 4.

FIG. 5a shows a control signal for such a camera. From the instant $t_0$, the shutter 1 is energized via control wires 26. During each field period $t_f$ of 20 msec in this embodiment, the electrodes 4, 5 of the shutter are energized with a pulse whose pulse height, dependent on the electro-optical material used, is, for example 100 volts at a pulse width $t_w$ of 2 msec. After some time (after about 0.5 msec) the shutter is completely blocked and hardly passes incident light 28. During the period $t_w$ the charge image which is collected in the image section is (rapidly) transported to the storage section in the CCD sensor 23. Since the optical switch is in its blocked state, incident light 28 will be incident in a fainter form on the image sensor. This fainter light, realized by the optical switch, ensures that the artifact shown as smear hardly occurs.

After the pulse 30 drops off, the light is incident on the sensor 23; this particularly applies when a material which is light transmissive (in the unenergized state) such as a gel is chosen. Analogously as for a gel, this also holds for a PDLC, be it that a PDLC is light-diffusing in the unenergized state.

After the field period tf, the shutter is energized again, this time with a pulse 30' of opposite sign. The shutter is controlled at such an alternating voltage so as to inhibit degradation of the electro-optical material (LC).

Figure 5B:
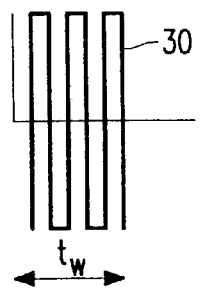

FIG. 5b shows a variant of the pulse shape of the pulses 30, 30'. The pulse shown is formed as a high-frequency AC signal. At a sufficiently high frequency, it is achieved that the electrodes are heated. If necessary, the frequency is adapted, dependent on the ambient temperature and the desired temperature of the shutter.

The example of FIG. 4 relates to a black-white camera having only one LCD. It will be evident that for color cameras the device is extended in a generally known manner by, for example a prism, color splitters, etc., in which a separate LCD image sensor unit is used for each spectral color.

Instead of a shutter as described with reference to FIGS. 1, 2, the camera of FIG. 4 may also be implemented with an element having a diaphragm function as described with reference to FIG. 6, in which the central part and each concentrical ring can be driven separately.

Although switching between the light-transmissive and the light-diffusing state is described in this Application, the electro-optical element is driven in other applications in such a way that it is partly light-transmissive, preferably with a variable value of the light transmissiveness such as, for example in dipper uses for lamps. If desired, the electro-optical material then comprises a dye.

Figure 2:
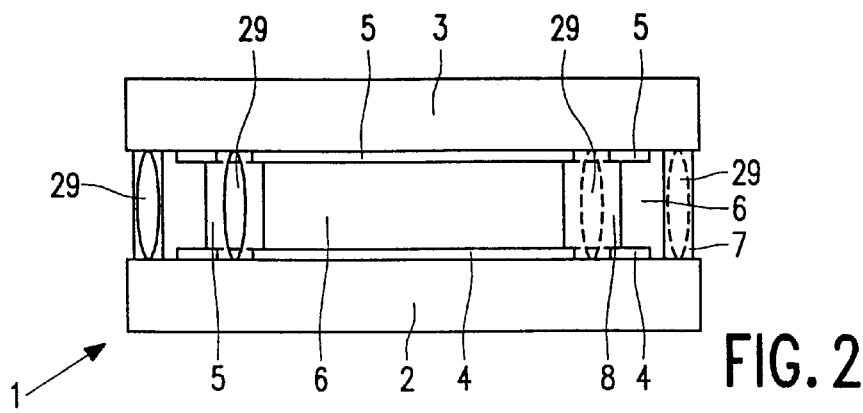
FIG. 2 is a cross-section taken on the line II—II in FIG. 1.
Figure 7A:
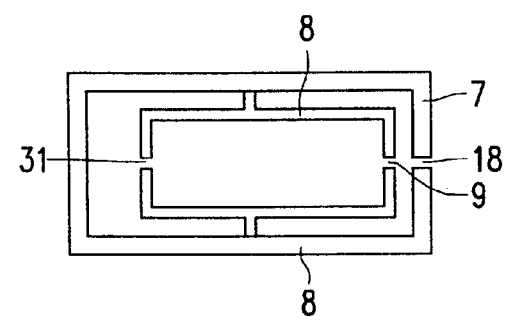
FIG. 7 shows some variants of FIG. 3.

FIG. 7 shows diagrammatically some variants of FIG. 2. FIG. 7a shows a variant in which the active area has a rectangular cross-section. Such a shutter is used in, for example measuring apparatus for passing or not passing laser beams.

Figure 7B:
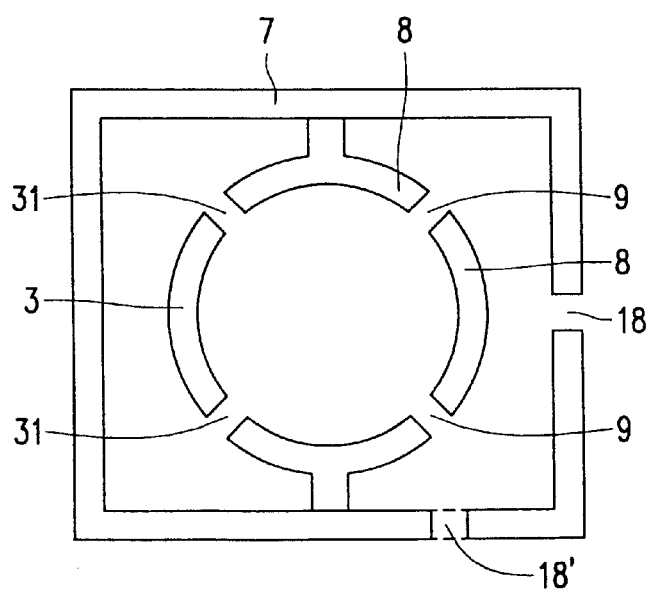

FIG. 7b shows a variant in which the inlet and outlet apertures 9, 31 are not in line with the filling aperture 18. The filling aperture may be present at different positions in the edge 8 at the side of the inlet apertures 9; a possible position for this filling aperture is diagrammatically denoted by the reference numeral 18' in FIG. 7b.

In another embodiment, the active area comprises, for example pixels which can be driven separately. Moreover, one of the two substrates may be opaque when such pixels are reflective (for example in a reflective display for projection purposes). The uniform thickness then leads to a capacity which is identical for different switching elements.

In summary, the invention relates to an electro-optical element (shutter) which is switchable between two or more optical states and has a large mechanical rigidity because an extra spacer edge is provided so that no or hardly any spacers are required in the active area. By providing apertures in the extra spacer edge, contaminations are prevented from being left in the active area during filling. The active area thus remains free from disturbances.

We claim:

1. An optical switching element having two substrates provided with a first drive electrode and a second transparent drive electrode, said substrates enclosing, within a sealing edge, a layer of an electro-optical material which is switchable between a plurality of optical states, characterized in that at least one further edge enveloping a part of the layer of electro-optical material and having at least one inlet aperture and at least one outlet aperture is situated between the two substrates within the area bounded by the sealing edge, said enveloping edge having substantially the same thickness as the sealing edge.

2. An optical switching element as claimed in claim 1, characterized in that the further enveloping edge has an inlet aperture and an outlet aperture which face each other.

3. An optical switching element as claimed in claim 1, characterized in that the inlet aperture and the outlet aperture in the enveloping edge are substantially in line with a filling aperture in the sealing edge.

4. An optical element as claimed in claim 1, characterized in that parts associated with the further enveloping edge between the inlet aperture and the outlet aperture extend as far as the sealing edge.

5. An optical switching element as claimed in claim 1, characterized in that the area between the sealing edge and the further enveloping edge is provided with spacers.

6. An optical switching element as claimed in claim 1, characterized in that the electro-optical material is switchable between a light-transmissive and a light-diffusing state.

7. An optical switching element as claimed in claim 1, characterized in that the first and the second drive electrode are transparent, are provided with drive means and are structured in such a way that facing parts of the transparent drive electrodes are substantially completely bounded by the further enveloping edge.

8. An optical switching element as claimed in claim 7, characterized in that the electrodes are subdivided into sub-electrodes within the electrode parts bounded by the further enveloping edge, and the separate sub-electrodes are provided with separate drive means.

9. An optical switching element as claimed in claim 1, characterized in that spacers are present in the further enveloping edge and the sealing edge.

10. A camera comprising a charge-coupled device, characterized in that the camera comprises an optical element as claimed in claim 1, as well as drive means for the optical element.

* * * * *